Dec. 15, 1953  A. G. OBERMAIER  2,663,005
ELECTRIC POINTER CLAMP FOR INDICATING INSTRUMENTS
Filed May 19, 1951  2 Sheets-Sheet 1
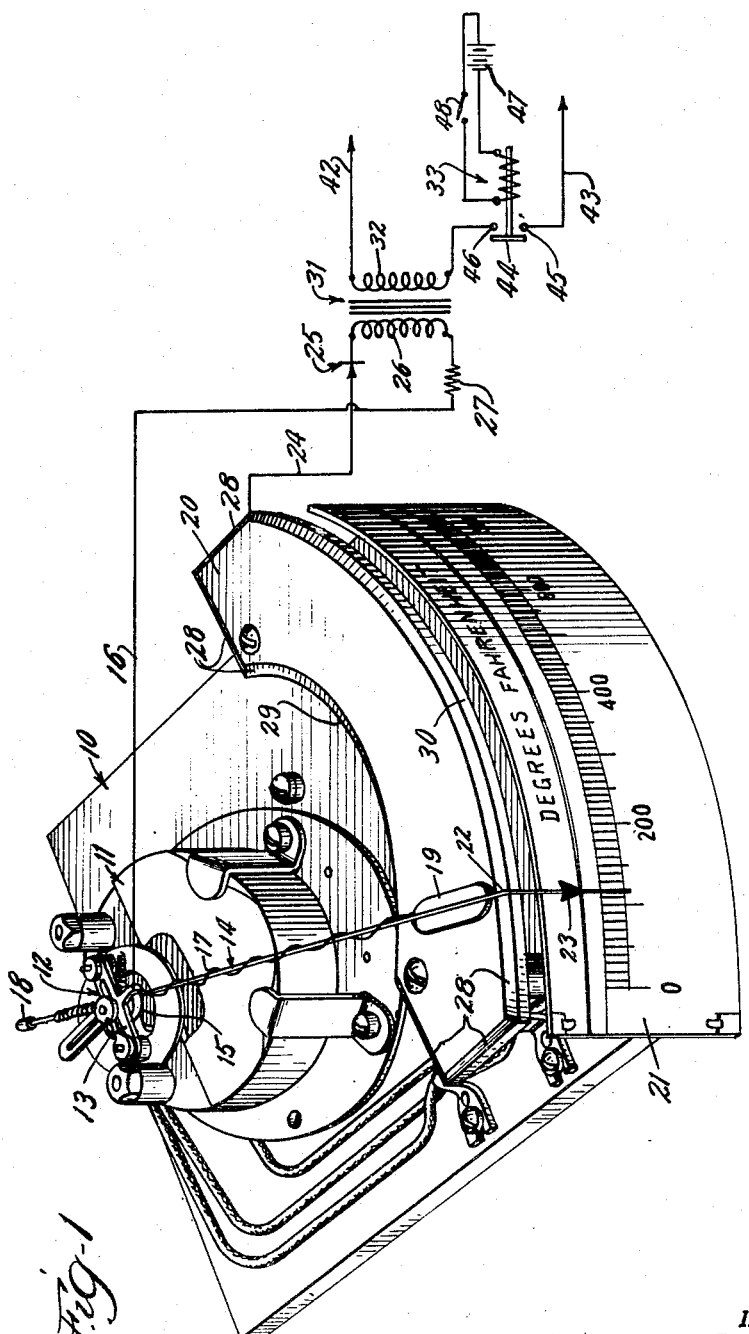
INVENTOR.
Alfred A. Obermaier
BY
Robert H. Wendt
Atty.

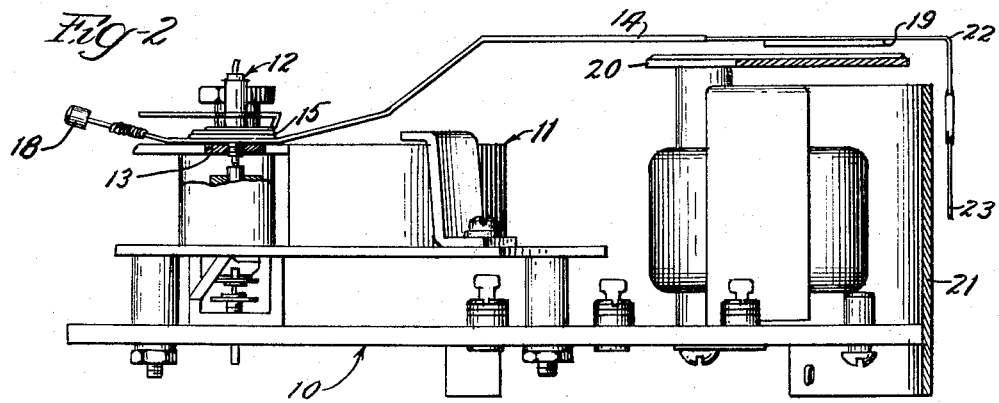
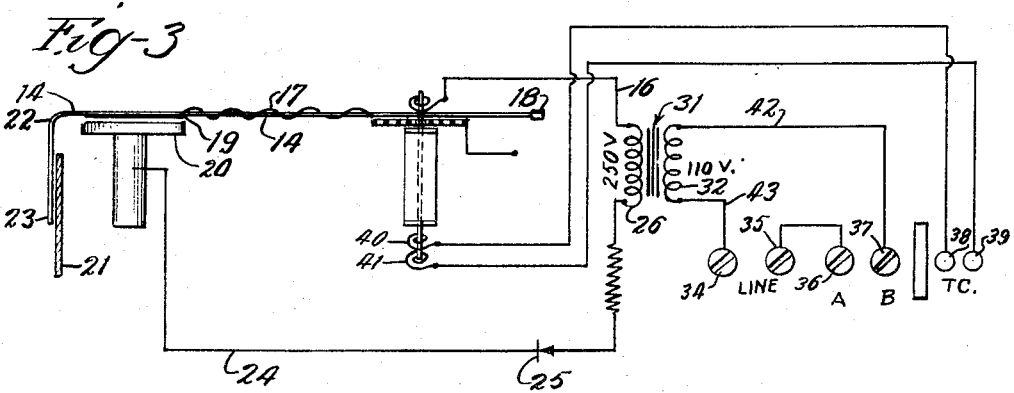

Patented Dec. 15, 1953

2,663,005

UNITED STATES PATENT OFFICE 2,663,005

ELECTRIC POINTER CLAMP FOR INDICATING INSTRUMENTS

Alfred A. Obermaier, Park Ridge, Ill., assignor to Illinois Testing Laboratories, Inc., Chicago, Ill., a corporation of Illinois Application May 19, 1951, Serial No. 227,195

8 Claims. (Cl. 324—155)

1

The present invention relates to electric pointer clamps for indicating instruments, and is particularly concerned with the provision of an improved means for holding the pointer of an indicating instrument at any desired indicating position so that its indication will remain constant, and can be read at any time desired by the user, instead of requiring the user to be present at the time the indication is made.

One of the objects of the invention is the provision of an improved electric pointer clamp for use on indicating instruments, by means of which the relatively light pointer can be held in any indicating position without damaging the pointer and without in any way detracting from the accuracy of the instrument.

Another object of the invention is the provision of an improved pointer clamping device which is adapted to be actuated electrically, and which may, therefore, be controlled by suitable electric circuits and relays without necessity for performing any manual operations on the instrument.

Another object of the invention is the provision of an electric pointer clamp for indicating instruments, which is simple in construction, durable, capable of economical manufacture, and adapted to be used for a long period of time without affecting substantially the accuracy or sensitivity of the instrument.

Other objects and advantages of the invention will be apparent from the following description and the accompanying drawings, in which similar characters of reference indicate similar parts throughout the several views.

Referring to the two sheets of drawings accompanying this specification,

Fig. 1 is a view in perspective of an electrical instrument embodying the invention, shown in connection with a relay circuit for controlling the clamping action;

Fig. 2 is a side elevational view of the device of Fig. 1;

Fig. 3 is a diagrammatic illustration of the instrument and its wiring diagram, shown in connection with the terminal posts with which the instrument is preferably provided.

Referring to Fig. 1, 10 indicates in its entirety an electrical measuring instrument of the moving coil type, which is provided with a vane clamping arrangement embodying the invention. The instrument movement housing 11 is provided with the usual type of moving coil element 12 mounted upon jewel bearings, one of which is carried by bridge 13.

2

In addition to the usual hair springs for urging the pointer 14 to zero position and for carrying current to the moving coil, the instrument is provided with a third spring 15 suitably insulated from the moving coil of the instrument but at the same potential with respect to the aluminum pointer tubing. A fine copper wire may be wound about the pointer extending from this third spring to the vane to aid in increasing the conductivity of the pointer 14.

The insulated wire 17 may be wound about the pointer, which has the usual counterbalancing members 18 at its opposite end. The fine insulating wire 17 leads to a vane 19 which is soldered to the pointer on its lower side, and which is quite accurately spaced from a second electrode 20, which may consist of a scale pan.

The spacing, for example, may be about twenty thousandths of an inch between the vane 19 and the scale pan 20.

The instrument which is illustrated has a substantially cylindrical dial plate 21 and has its pointer downwardly turned at 22 and provided with the pointing end 23, which is adjacent the scale on the dial plate 21. In other embodiments of the invention the pointer might be a straight one, and the scale might be carried directly by the scale pan 20.

The amount of spacing between the vane 19 and the scale pan 20, which are parallel to each other, depends on the voltage which is to applied; and the spacing used as an example is suitable for a voltage of about 250 volts.

The scale pan 20 is connected by a conductor 24 to a rectifier 25, the other terminal of which is connected to the secondary 26 of a transformer. The conductor 16 is connected through a limiting resistance 27 to the other terminal of the secondary 26. The resistance 27 is of high resistance for definitely limiting the amount of current which may pass from vane 19 to plate 20.

Plate 20 is preferably provided with an insulated surface, which in some cases may be an anodized surface on an aluminum plate, or it may consist of a layer of condenser paper cemented to the metal plate 20. The insulated surface prevents the passage of current when the vane is clamped.

The vane 19 is oval for the purpose of increasing the area of the electrostatic field between the vane and the plate 20. The plate 20 is preferably beveled at 28 or provided with rounded corners for eliminating the electrostatic field effects which take place at sharp corners and tend to distort the field acting on the vane 19.

The vane 19 is also preferably slightly shorter than the radial width of the plate 20, which is arcuate in shape, having an inner concave surface 29 and an outer concentric convex surface 30. The radius on which the edges 29 and 30 are formed is substantially at the axis of the moving coil 12.

The transformer 31 has its primary 32 connected to a suitable source of A. C., such as a 110 volt 60 cycle circuit through a relay 33.

Referring to Fig. 3, this shows the circuit without the relay and with the terminal connectors 34—39. Terminals 38 and 39 may lead to the usual current carrying springs 40 and 41 of the instrument movement for actuating the pointer responsive to temperature as determined by a thermocouple.

The conductors 42, 43 of the primary 32 may lead to the 60 cycle 110 volt line. The relay contact 44 is adapted to close that circuit at the fixed contacts 45, 46. The relay may be energized by means of a suitable battery 47 and controlled by a hand switch 48 or controlled responsive to some particular condition which is sought to be measured.

The operation of the present device is as follows: When the pointer has been moved by its moving coil element to indicate the number of degrees Fahrenheit which the user desires to measure, the relay circuit may be closed at 48, energizing the relay. This will close the contacts through the primary of the transformer 31, energizing the secondary; but the current output of the secondary is definitely limited by the limiting resistance 27 which, for example, may be one megohm; and the polarity of the current output is determined by the rectifier 25 in that circuit, which permits current to flow only in one direction.

The amount of current which flows is quite negligible, amounting only to that necessary to charge the vane 19 and the plate 20, which are spaced from each other. The charging current, however, and voltage applied, amounting to about 250 to 260 volts, or any higher value, brings into existence an electrostatic field between the vane 19 and the plate 20.

The voltage may be either A. C. or D. C. and its magnitude would depend upon the geometry of the vane and spacing between the vane and plate.

These being oppositely charged, they are attracted to each other; and the pointer 14 being sufficiently resilient, the vane 19 is drawn to the plate 20 and effectively clamped in fixed position against the plate 20 because the returning springs are not sufficient to overcome the friction between the vane 19 and the plate 20 under this clamping force.

Thus the indication of temperature may be read at any time; and thereafter the relay circuit may again be opened at 48, opening the energizing circuit of the transformer and reducing to zero the electrostatic charges on the vane 19 and plate 20, which are discharged through the secondary 26.

The attractive force then ceases; and the pointer bends back to its original straight condition, spacing the vane 19 from the plate 20 and permitting the pointer to swing freely again.

It will thus be observed that I have invented an improved clamping arrangement for pointers of indicating instruments, by means of which the clamping of the pointer may be easily controlled by electric circuits.

The present clamping arrangement is positive in its action, both in clamping and in releasing the pointer; and as the vane 19 may be made of aluminum, a minimum amount of weight is added to the pointer. The sensitivity and the accuracy of the instrument are not materially affected by this arrangement.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In an indicating instrument, the combination of a pointer and a moving element movable responsive to a condition to be measured, with a scale for indicating the measurement in connection with the pointer, a fixed conducting plate located adjacent the pointer and uniformly spaced from the pointer throughout a predetermined range of movement, a movable conducting plate carried by the pointer and spaced from but close to the first-mentioned conducting plate, insulation between said plates, and means for impressing a D. C. charge upon said plates of opposite polarity so that the two plates will be attracted to each other, and the pointer will be held by engagement of the two plates at any position in which it happens to be at the time the charge is applied.

2. In an indicating instrument, the combination of a pointer and a moving element movable responsive to a condition to be measured, with a scale for indicating the measurement in connection with the pointer, a fixed conducting plate located adjacent the pointer and uniformly spaced from the pointer throughout a predetermined range of movement, a movable conducting plate carried by the pointer and spaced from but close to the first-mentioned conducting plate, insulation between said plates, and means for impressing a D. C. charge upon said plates of opposite polarity so that the two plates will be attracted to each other, and the pointer will be held by engagement of the two plates at any position in which it happens to be at the time the charge is applied, the said movable plate comprising a light aluminum vane secured to the pointer.

3. In an indicating instrument, the combination of a pointer and a moving element movable responsive to a condition to be measured, with a scale for indicating the measurement in connection with the pointer, a fixed conducting plate located adjacent the pointer and uniformly spaced from the pointer throughout a predetermined range of movement, a movable conducting plate carried by the pointer and spaced from but close to the first-mentioned conducting plate, insulation between said plates, and means for impressing a D. C. charge upon said plates of opposite polarity so that the two plates will be attracted to each other, and the pointer will be held by engagement of the two plates at any position in which it happens to be at the time the charge is applied, the said means including fine insulated wire secured about the pointer and leading to a current conducting spring connected to a suitable terminal.

4. In a pointer clamping device for indicating instruments, the combination of an electrical instrument having a moving element and a pointer carried thereby, and a scale over which the pointer plays, an electrical conducting plate arranged parallel to the plane of movement of the pointer, and a light metal vane carried by the pointer in close proximity to but spaced from said plate, a thin layer of insulation between said vane and plate for preventing relatively high voltage discharge between them, and means for impressing a direct current charge on the plate and the vane of opposite polarity so that the vane is attracted to the plate, the pointer bending slightly until the vane engages the plate and is frictionally held against movement away from the indication which it is giving at the time it is attracted.

5. In a pointer clamping device for indicating instruments, the combination of an electrical instrument having a moving element and a pointer carried thereby, and a scale over which the pointer plays, an electrical conducting plate arranged parallel to the plane of movement of the pointer, and a light metal vane carried by the pointer in close proximity to but spaced from said plate, a thin layer of insulation between said vane and plate for preventing relatively high voltage discharge between them, and means for impressing a direct current charge on the plate and the vane of opposite polarity so that the vane is attracted to the plate, the pointer bending slightly until the vane engages the plate and is frictionally held against movement away from the indication which it is giving at the time it is attracted, said insulating layer comprising a layer of electrically insulating paper carried by the conducting plate.

6. In a pointer clamping device for indicating instruments, the combination of an electrical instrument having a moving element and a pointer carried thereby, and a scale over which the pointer plays, an electrical conducting plate arranged parallel to the plane of movement of the pointer, and a light metal vane carried by the pointer in close proximity to but spaced from said plate, a thin layer of insulation between said vane and plate for preventing relatively high voltage discharge between them, and means for impressing a direct current charge on the plate and the vane of opposite polarity so that the vane is attracted to the plate, the pointer bending slightly until the vane engages the plate and is frictionally held against movement away from the indication which it is giving at the time it is attracted, said means comprising a transformer having its secondary connected to the plate and vane through a rectifier, said transformer being controlled by a relay, a source of energization for said relay, and switching means for controlling the energization of the relay to apply the charge to said plate and vane.

7. In a pointer clamping device for indicating instruments, the combination of an electrical instrument having a moving element and a pointer carried thereby, and a scale over which the pointer plays, an electrical conducting plate arranged parallel to the plane of movement of the pointer, and a light metal vane carried by the pointer in close proximity to but spaced from said plate, a thin layer of insulation between said vane and plate for preventing relatively high voltage discharge between them, and means for impressing a direct current charge on the plate and the vane of opposite polarity so that the vane is attracted to the plate, the pointer bending slightly until the vane engages the plate and is frictionally held against movement away from the indication which it is giving at the time it is attracted, the said plate being arcuate in shape and formed on a radius substantially equal to the distance from the plate to the axis of the pointer.

8. In an electric pointer clamp for indicating instruments, the combination of a support with an electrical instrument movement carried thereby, and having a movable element, said movable element carrying a resilient pointer, a scale plate, scale divisions, and indicia cooperating with said pointer to indicate the movement of the pointer, an arcuate electric conducting plate carried by said support and located closely beneath the sweep of the pointer, an electric conducting vane carried by said pointer adjacent to but out of contact with said plate, a thin, light electrical conductor extending along said pointer and connected to said pointer vane, a source of high potential direct current connected to said conductor and to said conducting plate, and a thin layer of insulation carried by said conducting plate on its face for preventing a short circuit between the vane and conducting plate, and switching means for controlling the application of said direct current, the direct current charging the vane and plate with static charges of opposite polarity, causing the vane to be attracted to the plate, the resilient pointer bending, and the vane coming into tight frictional engagement with the insulating layer on said plate to hold the pointer in the position in which it is indicating relative to the scale until released by release of the charges carried by said vane and plate.

ALFRED A. OBERMAIER.

References Cited in the file of this patent

UNITED STATES PATENTS

| Number | Name | Date |
|---|---|---|
| 554,275 | Kelly | Feb. 11, 1896 |
| 749,775 | La Cour | Jan. 19, 1904 |
| 1,415,528 | Craighead | May 9, 1922 |

FOREIGN PATENTS

| Number | Country | Date |
|---|---|---|
| 447,242 | Germany | July 20, 1927 |